W. W. Dutcher,
Setting Temple Teeth.

Nº 59,984.        Patented Nov. 27, 1866

Witnesses:
Samuel N. Piper.
Curtis.

Inventor
W. W. Dutcher.
By his Attorney
R. H. Eddy

United States Patent Office.

IMPROVED TOOL FOR SETTING TEMPLE TEETH.

WARREN W. DUTCHER, OF MILFORD, MASSACHUSETTS.

Letters Patent No. 59,984, dated November 27, 1866.

SPECIFICATION.

TO ALL PERSONS TO WHOM THESE PRESENTS SHALL COME:

Be it known that I, WARREN W. DUTCHER, of Milford, in the county of Worcester, and State of Massachusetts, have invented a new and useful Tool for Setting Loom Temple Teeth in their cylinders; and I do hereby declare the same to be fully described in the following specification, and represented in the accompanying drawings, of which—

Figure 1:
Figure 2:
Figure 3:

Figure 1 is a side view.
Figure 2, an edge view; and
Figure 3, a vertical section of it.

The implement in question is designed to be employed in inserting a metallic tooth in the wooden cylinder of a rotary temple, and operates to determine the correct pitch of the tooth, or its angular inclination to the surface in which it may be fixed. The said implement, by being magnetized, will hold in its socket a metallic tooth, when placed therein, preparatory to being driven into the cylinder.

The tool consists of a bar, A, of steel, having its lower end bevelled or arranged at the angle to the axis of the bar at which the axis of a temple tooth is to stand with respect to the surface of its cylinder. From the said bevelled end, and at its middle, a conical socket, $b$, opening at top into a hole, $c$, going transversely through the bar, extends upward into the bar. The purpose of the hole $c$ is to prevent injury to the point of the temple tooth when such tooth may be within the socket, as well as while the implement may be in the act of being used. Such point will extend into the hole $c$ a short distance, but not to touch the upper part of such hole. The instrument so formed may be provided with a head, $d$, for receiving the blows of the hammer or mallet employed for driving the temple teeth into their cylinder; and, furthermore, the instrument, at its lower end and socket, should be magnetized by drawing it over and upon a magnet, or by otherwise rendering it magnetic. The attractive power of the magnetism will cause it to hold a tooth in the socket, so as to prevent it from dropping out therefrom while the person may be in the act of moving the tooth to the hole for its reception.

In using the instrument, after a tooth may have been placed in its socket, $b$, the workman having one hand hold of the instrument, is to insert the base of the tooth in the mouth of the hole destined to receive it, and is next to strike with a hammer or mallet on the head of the tool until the bevelled end of the tool may come down flat upon the surface of the cylinder, and be in parallelism, or about so, with the axis of the cylinder. The tooth will then be set at its proper inclination. The bevel of the end of the tool enables the workman, while applying the tooth to the mouth of the hole, to adjust the instrument to the proper inclination for driving the tooth into the wood; that is, so that it may not be caused to swerve from the hole for its reception. The teeth of the temple roller or cylinder are to stand in radial directions, but each is to lean toward one end of the cylinder in order to effectually hold the cloth to the cylinder, as may be necessary during the process of weaving such cloth.

I claim as my invention—

The rotary temple tooth-setting tool, made substantially in manner and so as to operate as and for the purpose hereinbefore specified.

WARREN W. DUTCHER.

Witnesses:
R. H. EDDY,
F. P. HALE, Jr.